US011665030B2

(12) United States Patent
Kaku et al.

(10) Patent No.: US 11,665,030 B2
(45) Date of Patent: May 30, 2023

(54) RELAY DEVICE

(71) Applicant: DENSO CORPORATION, Kariya (JP)

(72) Inventors: Yoshifumi Kaku, Kariya (JP); Taichi Itagawa, Kariya (JP)

(73) Assignee: DENSO CORPORATION, Kariya (JP)

(*) Notice: Subject to any disclaimer, the term of this patent is extended or adjusted under 35 U.S.C. 154(b) by 226 days.

(21) Appl. No.: 16/809,668

(22) Filed: Mar. 5, 2020

(65) Prior Publication Data

US 2020/0313936 A1    Oct. 1, 2020

(30) Foreign Application Priority Data

Mar. 29, 2019  (JP) .............................. JP2019-068010

(51) Int. Cl.
*H04L 25/20*    (2006.01)
*H04L 69/324*   (2022.01)
*H04L 45/00*    (2022.01)

(52) U.S. Cl.
CPC ............ *H04L 25/20* (2013.01); *H04L 69/324* (2013.01); *H04L 45/20* (2013.01)

(58) Field of Classification Search
CPC ........ H04L 25/20; H04L 69/324; H04L 45/20
See application file for complete search history.

(56) References Cited

U.S. PATENT DOCUMENTS

| 6,873,618 | B1 * | 3/2005 | Weaver | ................... | H04L 45/16 |
| | | | | | 370/389 |
| 2002/0080755 | A1 * | 6/2002 | Tasman | ................... | H04L 45/16 |
| | | | | | 370/338 |
| 2003/0120806 | A1 * | 6/2003 | Clune | .................. | H04L 12/185 |
| | | | | | 709/250 |
| 2008/0062901 | A1 * | 3/2008 | Kadowaki | ............. | H04B 1/707 |
| | | | | | 370/310 |
| 2010/0316057 | A1 | 12/2010 | Shiraki et al. | | |
| 2013/0156031 | A1 | 6/2013 | Mitsumori | | |
| 2013/0315244 | A1 * | 11/2013 | Rabie | ................. | H04L 12/4645 |
| | | | | | 370/392 |
| 2016/0359731 | A1 * | 12/2016 | Kaku | ...................... | H04L 45/02 |
| 2017/0012694 | A1 | 1/2017 | Kaku | | |
| 2017/0041161 | A1 * | 2/2017 | Kaku | .................. | H04L 43/0847 |

FOREIGN PATENT DOCUMENTS

| BR | PI0716887 A2 * | 5/2011 | ........... H04B 17/318 |
| CN | 101494549 A | 7/2009 | |
| JP | 2015-109532 A | 6/2015 | |
| JP | 2018-174480 A | 11/2018 | |

\* cited by examiner

*Primary Examiner* — Elton Williams
(74) *Attorney, Agent, or Firm* — Posz Law Group, PLC

(57) ABSTRACT

A relay device for relaying a frame includes: communication ports respectively connected with communication lines; a receiver receiving a frame addressed to a transfer destination device connected through one communication port; a selector selecting one or more communication ports respectively connected to one or more transfer destination devices, based on connection information of the communication ports and the transfer destination devices and group information indicating whether the transfer destination devices belong to a predetermined group; and a transmitter transmitting the frame through selected communication ports.

6 Claims, 6 Drawing Sheets

FIG. 7

| index | NUMBER OF MULTICAST HOPS (TTL) | |
|---|---|---|
| | PATH A | PATH B |
| MULTICAST GROUP 1 | 1 | 1 |
| MULTICAST GROUP 2 | 0 | 2 |

RELAY DEVICE

CROSS REFERENCE TO RELATED APPLICATION

The present application claims the benefit of priority from Japanese Patent Application No. 2019-68010 filed on Mar. 29, 2019. The entire disclosure of the above application is incorporated herein by reference.

TECHNICAL FIELD

The present disclosure relates to a relay device configured to relay a received frame.

BACKGROUND

A conceivable technique described above discloses a technique of a relay device in which a communication line is connected to each of multiple ports, and when a broadcast frame is received by any of the multiple ports, the frame is transmitted from all ports other than the received port.

SUMMARY

According to an example. a relay device for relaying a frame may include: communication ports respectively connected with communication lines; a receiver receiving a frame addressed to a transfer destination device connected through one communication port; a selector selecting one or more communication ports respectively connected to one or more transfer destination devices, based on connection information of the communication ports and the transfer destination devices and group information indicating whether the transfer destination devices belong to a predetermined group; and a transmitter transmitting the frame through selected communication ports.

BRIEF DESCRIPTION OF THE DRAWINGS

The above and other objects, features and advantages of the present disclosure will become more apparent from the following detailed description made with reference to the accompanying drawings. In the drawings:

FIG. 7 is an illustrative diagram illustrating an example of a path determination table.

DETAILED DESCRIPTION

In a conceivable relay device, the multiple transfer destination devices are required to cope with multicast as destinations. As a result of a detailed examination by the present inventors, a problem has been found that, in the above-mentioned relay device, when a multicast frame is received in any of multiple ports and a frame is transmitted from all ports except for the received port, the frame is transmitted to a port in which a destination transfer destination device does not exist. In the above configuration, a useless unnecessary communication occurs in a port in which a destination transfer destination device does not exist and in a communication line connected to the port, and an extra processing load occurs in a device connected to the communication line.

Thus, a relay device is provided to inhibit a frame from being transmitted to a port where a destination transfer destination device does not exist when multicasting is performed in which multiple transfer destination devices become destinations.

According to an example embodiment, a relay device configured to relay a received frame, includes: a plurality of communication ports respectively connected with a plurality of communication lines; a receiver that receives a frame addressed to a transfer destination device connected through one of the communication ports from the one of the plurality of communication ports; a selector that selects one or more of the plurality of communication ports respectively connected to one or more of a plurality of transfer destination devices among the plurality of communication ports, based on connection information indicating through which of the one or more of the communication ports the one or more of the transfer destination devices are connected and group information including information indicating whether the one or more of the transfer destination devices belong to a predetermined group when the frame received by the receiver is to be relayed to the one or more of the transfer destination devices; and a transmitter that transmits the frame through selected one or more of the communication ports.

According to the configuration described above, when a frame is relayed to multiple transfer destination devices, the frame can be transmitted only to the communication port in which the multiple transfer destination devices exist, based on the connection information and the group information. Therefore, the unnecessary communication can be inhibited.

Embodiments of the present disclosure will be described below with reference to the drawings.

[1-1. Configuration]

Figure 1:
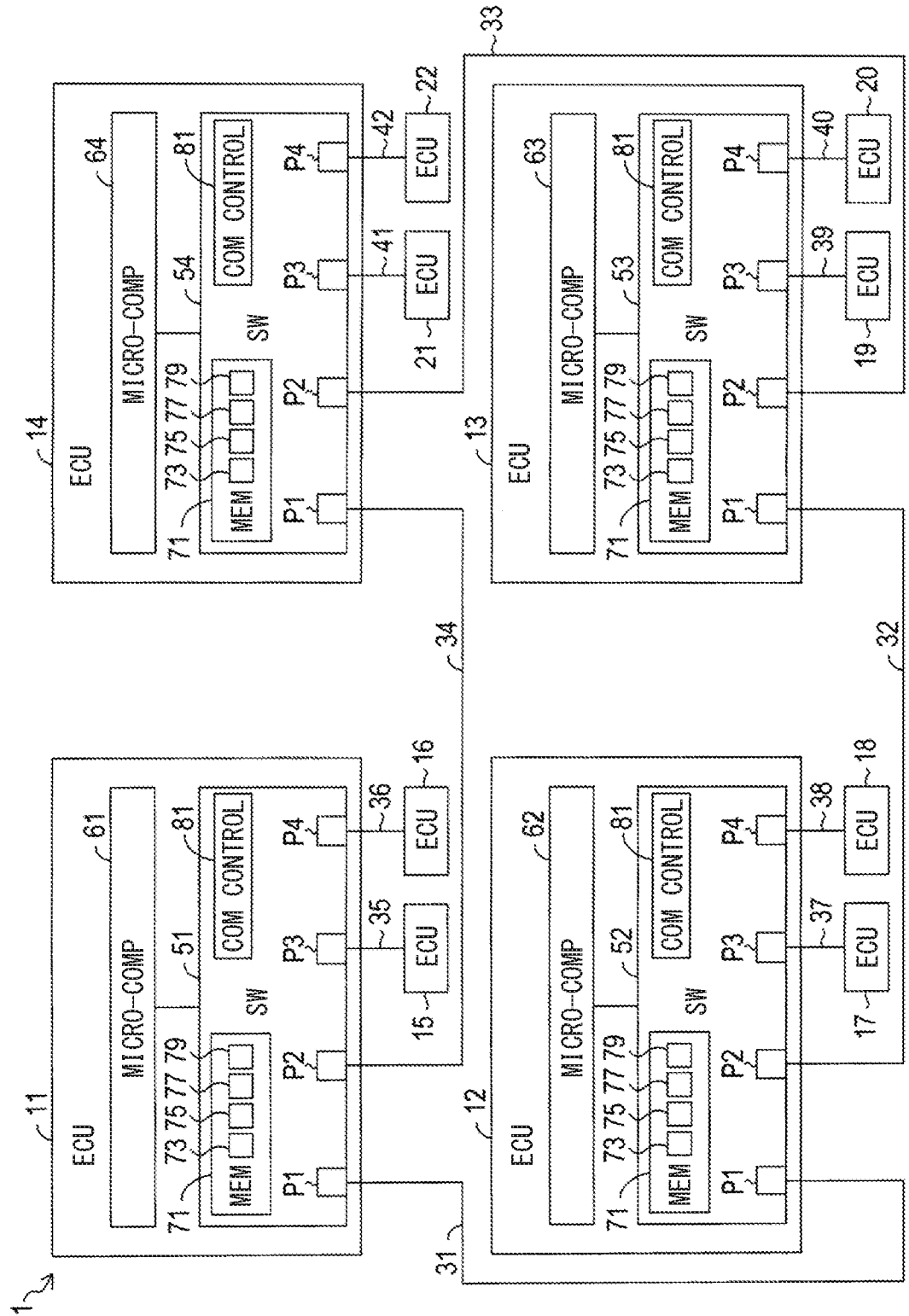
FIG. 1 is a configuration diagram showing a configuration of a communication network according to an embodiment.

A communication network 1 according to an embodiment shown in FIG. 1 is, for example, an Ethernet (registered trademark) network mounted on a vehicle such as a passenger car, and configures a communication system in the vehicle.

As shown in FIG. 1, the communication network 1 includes ECUs 11 to 22, which are electronic control devices, and communication lines 31 to 42. The ECU is an abbreviation for "Electronic Control Unit".

Each of the ECUs 11 to 14 is configured as a relay device for relaying a communication between the other ECUs 15 to 22, and includes Ethernet switches 51 to 54 which are Ethernet network switches. The ECUs 11 to 14 further include microcomputers 61 to 64 as arithmetic units, respectively. Although not illustrated, the microcomputers 61 to 64 include a CPU, a ROM, a RAM, and the like.

The switches 51 to 54 are, for example, layer 2 switches, and perform a communication for relaying a frame which is data according to a predetermined standard, in particular, a frame according to the Ethernet standard in the present embodiment. For that reason, each of the switches 51 to 54 includes multiple (for example, four in the present embodiment) communication ports (hereinafter referred to as ports)

P1 to P4 for transmitting and receiving frames, and a communication control unit 81 for performing a communication processing for relaying according to the Ethernet standard. The switches 51 to 54 further each include a MAC address table 73, a switch ID table 75, a multicast table 77, and a path determination table 79.

The tables 73, 75, 77, and 79 are stored in a memory 71 of each of the switches 51 to 54. The memory 71 is, for example, a volatile memory, but may be a rewritable non-volatile memory. The communication control unit 81 is configured by, for example, an integrated circuit, a microcomputer, or the like.

The operations of the switches 51 to 54 are realized by the communication control unit 81. The functions of the communication control unit 81 include a function of receiving a frame using multiple communication ports P1 to P4, a function of detecting an abnormality such as disconnection of the communication lines 31 to 34 connected to the multiple communication ports P1 to P4, and the like. The function of detecting an abnormality such as disconnection of the communication lines 31 to 34 is realized using, for example, a technique disclosed in JP-A No. 2017-34590.

In the communication network 1, the port P1 of the switch 51 of the ECU 11 and the port P1 of the switch 52 of the ECU 12 are connected to each other by the communication line 31, and the port P2 of the switch 52 of the ECU 12 and the port P1 of the switch 53 of the ECU 13 are connected to each other by the communication line 32. Further, the port P2 of the switch 53 of the ECU 13 and the port P2 of the switch 54 of the ECU 14 are connected to each other by the communication line 33, and the port P1 of the switch 54 of the ECU 14 and the port P2 of the switch 51 of the ECU 11 are connected to each other by the communication line 34.

In other words, the switches 51 to 54 are connected in a ring shape by connecting the ports P1 and P2 of each switch to the ports P1 and P2 of the other switches. For that reason, the switches 51 to 54 and the communication lines 31 to 34 connecting the switches 51 to 54 to each other configure a ring-shaped communication path capable of going around the frame once. The ring shape is also a loop shape.

The ECUs 15 and 16 are connected to the ports P3 and P4 of the switch 51 of the ECU 11 through the communication lines 35 and 36, respectively, and ECUs 17 and 18 are connected to the ports P3 and P4 of the switch 52 of the ECU 12 through the communication lines 37 and 38, respectively. The ECUs 19 and 20 are connected to the ports P3 and P4 of the switch 53 of the ECU 13 through the communication lines 39 and 40, respectively, and the ECUs 21 and 22 are connected to the ports P3 and P4 of the switch 54 of the ECU 14 through the communication lines 41 and 42, respectively.

In other words, among the ports P1 to P4 of the switches 51 to 54, the ports P3 and P4 that are not used for ring-shaped connections are connected to the ECUs 15 to 22 as communication nodes.

As the communication path between the switches 51 to 54, for example, when the switch 51 is set as a starting point, a counterclockwise communication path, which is a direction from the switch 51 to the switch 52, and a clockwise communication path, which is a direction from the switch 51 to the switch 54, exist. The two communication paths can function as two communication paths for a communication between the ECUs connected to the different switches 51 to 54 among the ECUs 15 to 22.

In the following description, among the ports P1 to P4 of the switches 51 to 54, the ports P1 and P2 used for the ring-shaped connection are also referred to as ring ports. The ports P3 and P4, which are not the ring ports and not used for the ring-shaped connection, are also referred to as normal ports.

Figures 2, 3, 4:
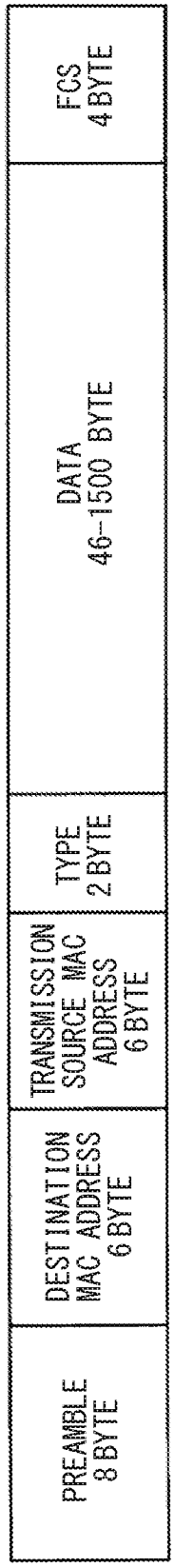
FIG. 2 is an illustrative diagram showing a configuration of an Ethernet frame.
FIG. 3 is an illustrative diagram illustrating an example of a switch ID table.
FIG. 4 is an illustrative diagram illustrating an example of a multicast table.

The frame communicated in the communication network 1 is, for example, an Ethernet frame shown in FIG. 2. The Ethernet frame includes a preamble, a destination MAC address, a source MAC address, types, data, and an FCS (Frame Check Sequence) field.

The destination MAC address is the MAC address of the destination device of the frame and corresponds to the destination address. The destination MAC address is an address indicating a multicast group when it is a multicast frame that designates multiple destination devices and transmits a frame. The source MAC address is the MAC address of the source device of the frame and corresponds to the source address. The MAC address corresponds to the address of the device.

On the other hand, the MAC address table 73 of each of the switches 51 to 54 is a table in which, for each of the ports P1 to P4 in the switch, the MAC address of the device connected to the destination of the port is registered.

Each of the switches 51 to 54 creates a MAC address table 73 by a well-known MAC address learning function. In other words, when a frame is received from any of the ports P1 to P4, the switches 51 to 54 register the numbers of the ports P1 to P4 that have received the frame and the source MAC address included in the received frame in association with each other in the MAC address table 73.

Each of the switches 51 to 54 has the following frame transfer function. When a frame has been received from any one of the ports P1 to P4, each of the switches 51 to 54 determines the ports P1 to P4 to which the received frame is transferred, based on the destination MAC address included in the received frame, which is the received frame, and the MAC address table 73.

Specifically, each of the switches 51 to 54 determines whether or not the same MAC address as the destination MAC address in the received frame is registered in the MAC address table 73 for the ports P1 to P4 other than the port at which the frame has been received, among the ports P1 to P4. If the same MAC address as the destination MAC address in the received frame is registered, the port in which the MAC address is registered is determined as the ports P1 to P4 of the transfer destination in the MAC address table 73. When the same MAC address as the destination MAC address in the received frame is not registered in the MAC address table 73, all the ports other than the port at which the frame has been received are determined as the ports P1 to P4 of the transfer destination.

Then, each of the switches 51 to 54 transmits the received frame from the ports P1 to P4 determined as the transfer destination. The frame transfer function described above is also a relay function for relaying the frame between the ECUs. The frame transfer operation in the case where the same MAC address as the destination MAC address is registered in the MAC address table 73 is called filtering, and the frame transfer operation in the case where the MAC address is not registered is called flooding.

In the MAC address table 73 of each of the switches 51 to 54, the MAC address of the device connected to the destination of the port P1 to P4 is registered for each of the ports P1 to P4 by the MAC address learning function and the frame transfer function of each of the switches 51 to 54.

For example, in the MAC address table 73 of the switch 51, the MAC address of the ECU 15 is registered for the normal port P3, and the MAC address of the ECU 16 is registered for the normal port P4. The MAC addresses of the ECUs 17 to 22 connected to the normal ports P3 and P4 of the other switches 52 to 54 are registered in each of the ring ports P1 and P2. This is because the ECUs 17 to 22 are connected to the ends of the ring ports P1 and P2 of the switch 51 through the other switches 52 to 54.

In the same manner, for example, in the MAC address table 73 of the switch 52, the MAC address of the ECU 17 is registered for the normal port P3, and the MAC address of the ECU 18 is registered for the normal port P4. The MAC addresses of the ECUs 15, 16, and 19 to 22 connected to the normal ports P3 and P4 of the other switches 51, 53, and 54 are registered in each of the ring ports P1 and P2.

In the communication network 1 described above, when a frame addressed to an ECU connected to a destination of the normal port P3 or P4 of another switch is transmitted from each ring port P1 or P2 of any switch, the frame is input to each of the ring port P1 and P2 of the other switch.

For example, it is assumed that the ECU 15 connected to the normal port P3 of the switch 51 transmits a frame addressed to the ECU 19 connected to the normal port P3 of the switch 53. In the present embodiment, the frame having the ECU 19 as the destination is a frame including the MAC address of the ECU 19 as the destination MAC address. The frame transmitted from the ECU 15 includes the MAC address of the ECU 15 as the source MAC address. In the following description, a frame addressed to the ECU 19, which has been transmitted from the ECU 15, is referred to as a frame f15-19.

In that case, the switch 51 receives the frame f15-19 from the normal port P3. If the switch 51 transmits the received frame f15-19 from the ring port P1, the frame f15-19 is input to the ring port P1 of the switch 53 through the switch 52. This is because the switch 52 receives the frame f15-19 transmitted by the switch 51 from the ring port P1 and transmits the frame from the ring port P2 by filtering. Thereafter, the switch 53 transmits the frame f15-19 received at the ring port P1 from the normal port P3 to the ECU 19.

If the switch 51 transmits the received frame f15-19 from the ring port P2, the frame f15-19 is input to the ring port P2 of the switch 53 through the switch 54. This is because the switch 54 receives the frame f15-19 transmitted by the switch 51 from the ring port P1 and transmits the frame from the ring port P2 by filtering. Thereafter, the switch 53 transmits the frame f15-19 received by the ring port P2 from the normal port P3 to the ECU 19.

On the other hand, although not shown, each of the switches 51 to 54 is provided with a non-volatile memory, and the ID (Identification) of the subject switch is stored in the non-volatile memory.

Next, the switch ID table 75 is a table representing the IDs of the other switches connected in a ring shape and the connection order of the other switches viewed from at least one of the ring ports P1 and P2 of the switch.

For example, the switch ID table 75 of the switch 51 is illustrated in FIG. 3. It should be noted that, when the number as the symbol attached to the switch is "n", the ID of the switch n is described as "IDn" in FIG. 3 and the following description.

As shown in FIG. 3, in the switch ID table 75, for each of the ring ports P1 and P2, the IDs of the other switches are registered in the same order as the connection order of the switches viewed from the ring port.

For that reason, in the case of the switch ID table 75 of the switch 51, the ID52 to ID54 of the other switches 52 to 54 are registered in the stated order of "ID52, ID53, and ID54" with respect to the port P1. This is because the connection order of the other switches 52 to 54 viewed from the port P1 of the switch 51 is the stated order of "the switch 52, the switch 53, and the switch 54". For the port P2, the ID52 to ID54 of the other switches 52 to 54 are registered in the stated order of "ID54, ID53, and ID52".

In other words, in the switch ID table 75 of each of the switches 51 to 54, the connection order of the other switches viewed from each of the ring ports P1 and P2 is represented by the registration order of the IDs. In the example of FIG. 3, the ID registered toward the left side indicates the ID of the switch closer to the ports P1 and P2. For that reason, in the switch ID table 75 of each of the switches 51 to 54, the order of registration of the IDs of the other switches is reversed between the registration order of the port P1 and the order of registration of the port P2.

The switch ID table 75 may be a table in which the IDs of the other switches are registered in the same order as the connection order of the switches when viewed from the ring port, with respect to only one of the ring ports P1 and P2. In other words, the switch ID table 75 may be a table in the upper stage or the lower stage only in FIG. 3. This is because, if the connection order of the other switches seen from one ring port is known, the connection order of the other switches seen from the other ring port can be known by reversing the order.

Further, in the switch ID table 75, the order of connection of the switches may be represented by, for example, adding an order number for each ID instead of the registration order of the IDs.

The IDs of the switches 51 to 54 may also be registered at fixed positions of the switches 51 to 54 in the switch ID table 75. In that case, the ID of the switch may be ignored when the connection order of the other switches is grasped.

Next, as shown in FIG. 4, the multicast table 77 associates, for each multicast group prepared in advance, whether or not each switch ID belongs to a multicast group. For example, in the example shown in FIG. 4, the switches ID 52 and ID 54 belong to a multicast group 1, and the switches ID 51 and ID 53 do not belong to the multicast group 1. Also, the switch IDs 53 and 54 belong to a multicast group 2, and the switch IDs 51 and 52 do not belong to the multicast group 2. In other words, the switches 51 to 54 are configured to be able to identify the multicast group corresponding to the destination MAC address and the switches 51 to 54 belonging to the group with reference to the multicast table 77. For example, the switch ID 52 belonging to the multicast group 1 indicates that at least one of the ECUs 17 and 18 connected to the normal ports P3 and P4 of the switch 52 belongs to the multicast group 1. In other words, if at least one of the ECUs 17 and 18 connected to the normal ports P3 and P4 of the switch 52 belongs to the multicast group 1, the switch ID 52 belongs to the multicast group 1. Further, for example, the fact that the switch ID 51 does not belong to the multicast group 1 indicates that the ECUs 15 and 16 connected to the normal ports P3 and P4 of the switch 51 do not belong to the multicast group 1. In other words, if both the ECUs 15 and 16 connected to the normal ports P3 and P4 of the switch 51 do not belong to the multicast group 1, the switch ID 51 does not belong to the multicast group 1.

The path determination table 79 will be described later.

[1-2. Processing]

[1-2-1. Relay Process when a Frame is Received from a Normal Port]

Figure 5:
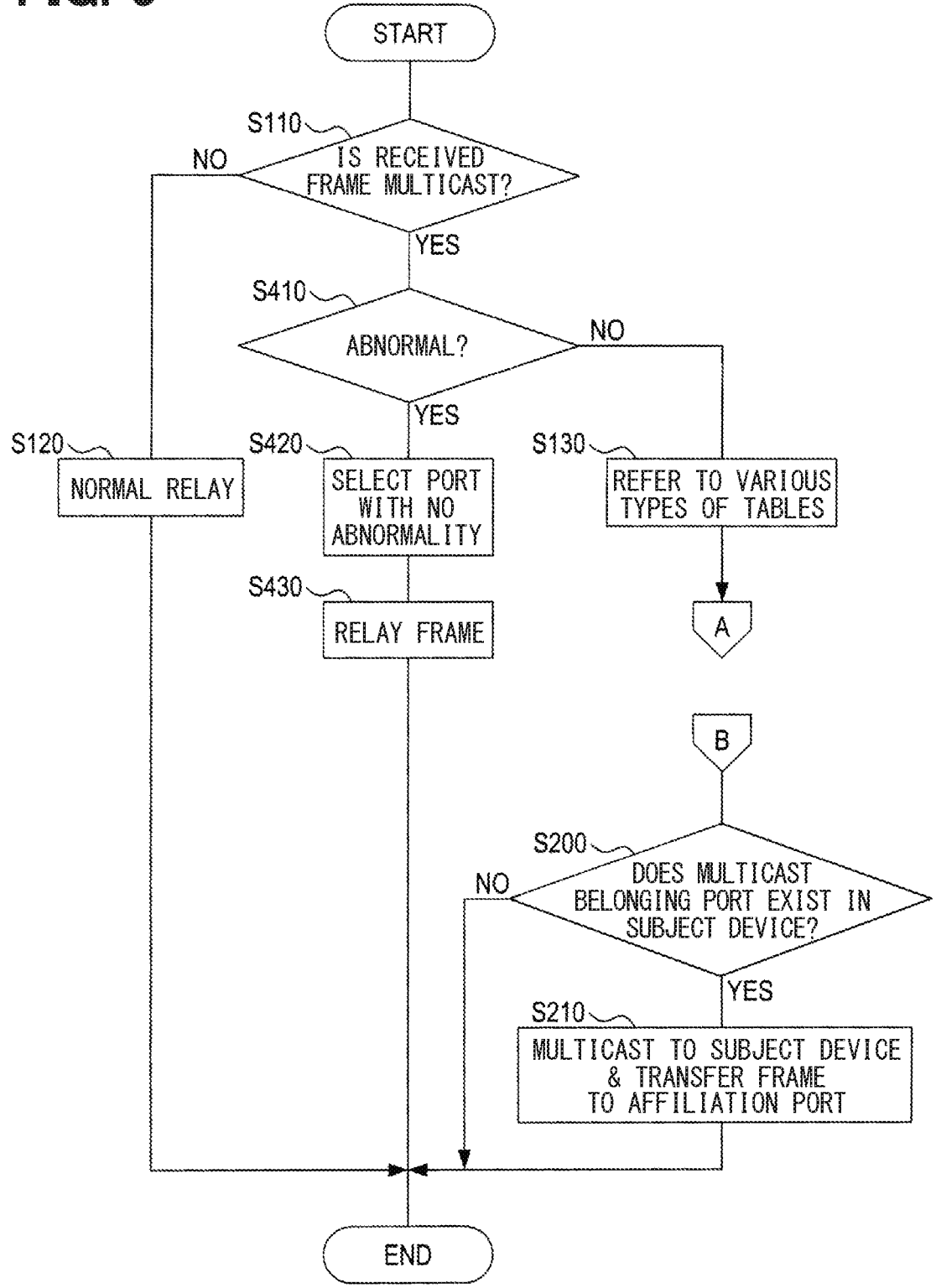
FIG. 5 is a flowchart of a part of a relay process at the time of reception a frame at a normal port.
Figure 6:
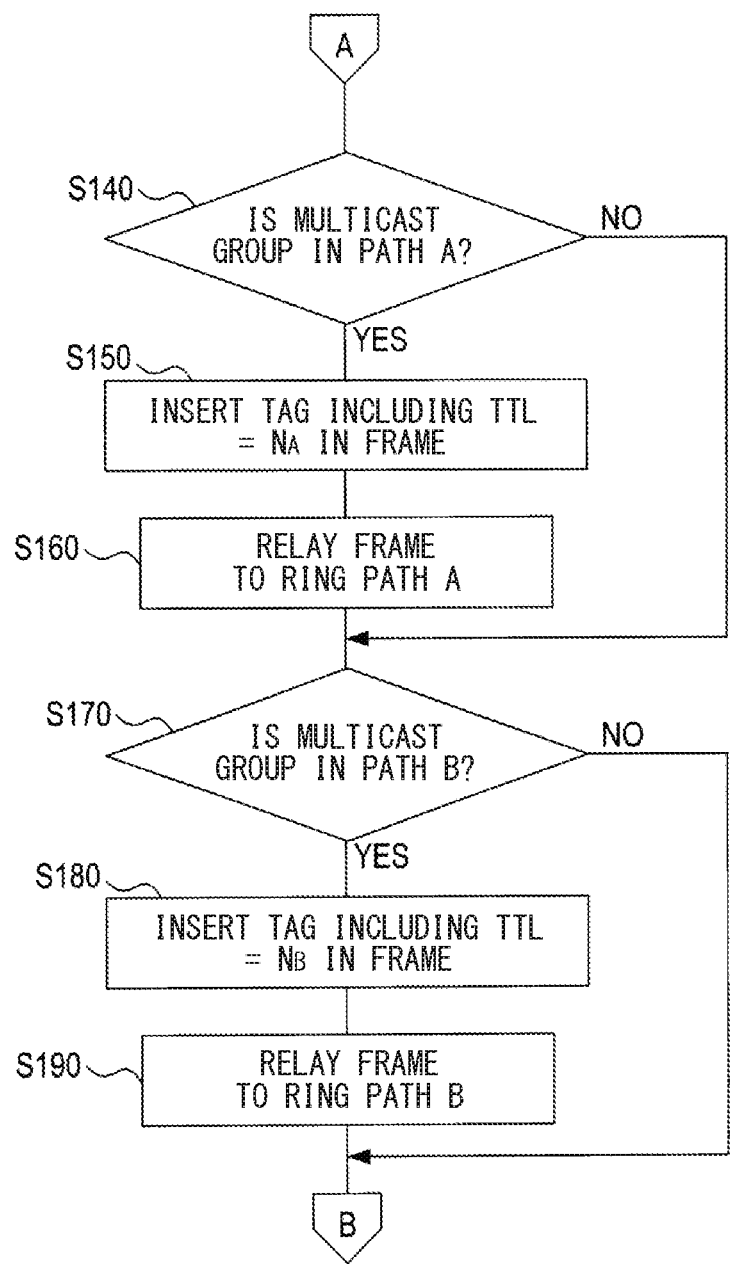
FIG. 6 is a flowchart of another part of the relay process at the time of receiving the frame at the normal port.

Next, a relay process to be executed by the communication control unit 81 will be described with reference to flowcharts of FIGS. 5 and 6. The relay process shown in FIGS. 5 and 6 is processing started when the frame is received from the normal port.

In the relay process, first, in S110, the communication control unit 81 determines whether or not the received frame is multicast. Whether or not the received frame is multicast is determined based on whether or not the destination MAC address is an address indicating multicast set in advance.

When the communication control unit 81 determines that the received frame is not multicast in S110, the communication control unit 81 proceeds to S120 and performs normal relay. The normal relay refers to the implementation of the frame transfer function described above. After the processing in S120, the relay process in FIGS. 5 and 6 is terminated.

On the other hand, when the communication control unit 81 determines that the received frame is multicast in S110, the communication control unit 81 proceeds to S410 and determines whether or not any of the multiple communication lines 31 to 42 has been detected.

When the communication control unit 81 does not detect the abnormalities of the multiple communication lines 31 to 42 in S410, the communication control unit 81 proceeds to S130 and refers to various tables. The table includes the MAC address table 73, the switch ID table 75, and the multicast table 77.

Subsequently, in S140, the communication control unit 81 determines whether or not there is ECUs 15 to 22 belonging to the multicast group in a path A. The path A indicates, for example, a path from the port P1 having a smaller port number among the ring ports. A path B to be described later indicates, for example, a path by a communication line connected to a port P2 having a larger port number among the ring ports.

The determination in this example is performed in the following procedure. First, the communication control unit 81 selects a multicast group corresponding to the destination MAC address from the multicast table 77. The selected multicast group is hereinafter, referred to as a multicast group.

Subsequently, the communication control unit 81 extracts the other switches 51 to 54 belonging to the multicast group from the multicast table 77. Then, the connection order of the other switches 51 to 54 belonging to the multicast group is recognized with reference to the switch ID table 75, and the path determination table 79 as shown in FIG. 7 is generated based on the connection order.

The path determination table 79 is generated for each of the switches 51 to 54 at the time of first execution of the processing. In the path determination table 79, as shown in FIG. 7, each of the multiple multicast groups is associated with a TTL in the multiple ring ports.

The path determination table 79 shown in FIG. 7 exemplifies the path determination table 79 in the ECU 11. The TTL is an abbreviation for Time To Live, and the TTL indicates the number of other switches 51 to 54 (hereinafter also referred to as the number of hops) to be routed between the switches 51 to 54 and the multiple ECUs 15 to 22 serving as destinations. In the path determination table 79, the TTLs of the path A and the path B are set so that the total number of hops is minimized based on the connection order of the other switches 51 to 54 belonging to the multicast group.

In the path determination table 79 shown in FIG. 7, in the multicast group 1, both the path A and the path B are associated with TTL=1. In other words, the path determination table 79 indicates that the ECUs 17 to 22 belonging to the multicast group 1 as the destination is connected to the switch 52 having the number of hops of 1 as seen from the port P1 of the switch 51 and the switch 54 having the hop number of 1 as seen from the port P2.

In the path determination table 79 shown in FIG. 7, in the multicast group 2, TTL=0 is associated with the path A of the switch 51, and TTL=2 is associated with the path B. In other words, as seen from the port P2 of the switch 51, the path determination table 79 indicates that the ECUs 17 to 22 belonging to the multicast group 2 serving as the destination is connected to the switch 53 having the number of hops of 2.

The switch 53 is a switch having the number of hops of 2 when seen from the port P1 of the switch 51, but the path B is selected in order to minimize the total number of hops. In other words, since the destination of the multicast group 2 includes the switch 54 having the number of hops of 1 from the port P2 of the switch 51, the path B passing through the switch 54 is selected.

More specifically, the following patterns exist when a frame is transmitted from the switch 51 to the ECUs 17 to 22 belonging to the multicast group 2. In the pattern of selecting the path A, the ECUs 17 to 22 belonging to the multicast group 2 as the destination are connected to the switch 54 having the number of hops of 3 as seen from the port P1 of the switch 51. Further, in the pattern of selecting the path B, the ECUs 17 to 22 belonging to the multicast group 2 as the destination are connected to the switch 54 having the number of hops of 2 as seen from the port P2 of the switch 51.

Further, in the pattern of selecting the path A and the path B, the ECUs 17 to 22 belonging to the multicast group 2 as the destination is connected to the switch 53 having the number of hops of 2 as seen from the port P1 of the switch 51, and the ECUs 17 to 22 belonging to the multicast group 2 as the destination is connected to the switch 54 having the number of hops of 1 as seen from the port P2 of the switch 51. The total number of hops in the case of selecting the path A is 3, the total number of hops in the case of selecting the path B is 2, and the total number of hops in the case of selecting the path A and the path B is at least 3. For that reason, the path B having the minimum total number of hops is selected.

The communication control unit 81 refers to the generated path determination table 79, and when the TTL value of the path determination table 79 in the path A in the multicast group is larger than 0, the communication control unit 81 determines that the ECUs 15 to 22 belonging to the multicast group exist in the path A. On the other hand, when the TTL value is 0 or less, the communication control unit 81 determines that the ECUs 15 to 22 belonging to the multicast group does not exist in the path A, and inhibits the frame transmission to the path A. As described above, the communication control unit 81 determines the necessity of frame transmission using the value of TTL, and inhibits unnecessary communication.

When the communication control unit 81 determines that the ECUs 15 to 22 belonging to the multicast group exists in the path A in S140, the communication control unit 81 proceeds to S150, and inserts a tag including TTL=NA in the received frame. The value of NA is the value of TTL in the path A in the multicast group in the path determination table 79.

Subsequently, in S160, the communication control unit 81 relays the frame to the path A, and proceeds to S170.

On the other hand, when the communication control unit 81 determines that the ECUs 15 to 22 belonging to the multicast group does not exist in the path A in S140, the communication control unit 81 proceeds to S170, and determines whether or not the ECUs 15 to 22 belonging to the multicast group exist in the path B. The communication control unit 81 refers to the path determination table 79, and when the TTL value of the path determination table 79 in the path B in the multicast group is larger than 0, the communication control unit 81 determines that the ECUs 15 to 22 belonging to the multicast group exist in the path B.

When the communication control unit 81 determines that the ECUs 15 to 22 belonging to the multicast group exists in the path B in S170, the communication control unit 81 proceeds to S180, and inserts a tag of TTL=NB in the received frame. The value of NB is the value of the TTL in the path B in the multicast group in the path determination table 79.

Subsequently, in S190, the communication control unit 81 relays the received frame to the path B, and proceeds to S200.

On the other hand, when the communication control unit 81 determines in S170 that the ECUs 15 to 22 belonging to the multicast group does not exist in the path B, the communication control unit 81 proceeds to S200, and determines whether or not there are multicast belonging ports in the switches 51 to 54 which are the subject devices. In this example, the communication control unit 81 refers to the multicast table 77, for example, and determines that there is a multicast belonging port if the switches 51 to 54, which are the subject devices, belong to the multicast group.

When the communication control unit 81 determines in S200 that the subject device has a multicast belonging port, the communication control unit 81 proceeds to S210 and transmits a frame to the multicast belonging port. In this example, the communication control unit 81 may transmit the frame to all of the normal ports P3 and P4, or may transmit the frame to only the ports other than the port that received the frame. After the above processing, the relay process of FIGS. 5 and 6 is terminated.

On the other hand, when the communication control unit 81 determines in S200 that there are no multicast belonging port in the subject device, the communication control unit 81 ends the relay process of FIGS. 5 and 6.

When an abnormality of the communication lines 31 to 42 is detected in S410, the communication control unit 81 proceeds to S420, and selects a ring port for transmitting a frame to the ECUs 15 to 22 to be the destination through only the communication lines 31 to 42 for which an abnormality is not detected. At this time, the communication control unit 81 calculates the TTL when passing through only the communication lines 31 to 42 for which no abnormality is detected, and adds a tag including the TTL to the received frame. Then, the communication control unit 81 selects the ring port and transmits the frame in S430. After the process in S430, the relay process of FIGS. 5 and 6 is terminated.

[1-2-2. Relay Process when a Frame is Received from a Ring Port]

Next, a relay process to be executed when the switches 51 to 54 receive a frame from the ring port will be described with reference to a flowchart of FIG. 8.

In S110 and S120, the process is performed in the same manner as in the flowcharts of FIGS. 5 and 6.

When the communication control unit 81 determines that the received frame is multicast in S110, the communication control unit 81 proceeds to S310 and determines whether or not the subject device has a multicast belonging port.

When the communication control unit 81 determines in S310 that there is a multicast belonging port in the subject device, the communication control unit 81 proceeds to S320, removes the tag including the TTL from the received frame, and transfers the received frame to the multicast belonging port of the subject device. In other words, the communication control unit 81 generates a frame obtained by removing the tag from the received frame, and transmits the generated frame. Thereafter, the process proceeds to S330.

On the other hand, when the communication control unit 81 determines in S310 that there are no multicast belonging ports in the communication control unit 81, the communication control unit 81 proceeds to S330, refers to the tag for the received frame prior to removing the tag, and determines whether or not the TTL is larger than 0. In this processing, the communication control unit 81 determines whether or not to transmit the received frame to the other switches 51 to 54 based on the TTL included in the received frame.

Figure 8:
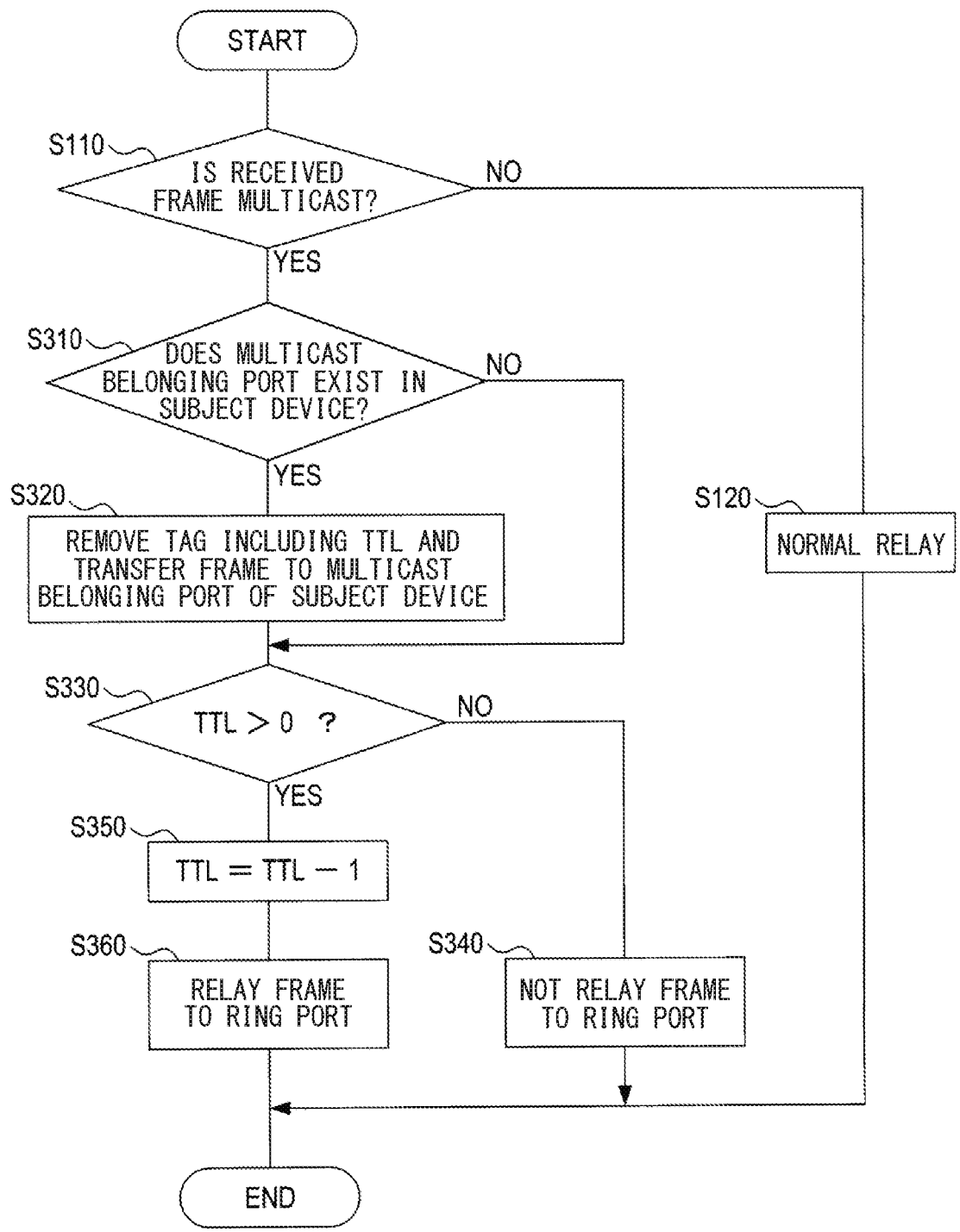
FIG. 8 is a flowchart of a relay process at the time of receiving the frame at a ring port.

When the communication control unit 81 determines that the TTL is 0 or less in S330, the communication control unit 81 proceeds to S340, determines not to transfer the received frame to the ring port, and terminates the relay process of FIG. 8.

On the other hand, when the communication control unit 81 determines that the TTL is larger than 0 in S330, the communication control unit 81 proceeds to S350 and decrements the TTL.

Subsequently, in S360, the communication control unit 81 transmits a frame to the ring port. The frame transmitted in this situation is a frame obtained by decrementing the TTL with respect to the received frame. It is preferable not to transmit the frame to a port that has received the received frame. Thereafter, the relay process of FIG. 8 is terminated.

[1-3. Effects]

According to the embodiment described in detail above, the following effects are obtained.

(1a) An aspect of the present disclosure is the ECUs 11 to 14 configured to relay the received frame. The ECUs 11 to 14 include the multiple communication ports P1 to P4 and the communication control unit 81.

The communication lines 31 to 42 are connected to the communication ports P1 to P4, respectively. The communication control unit 81 receives a frame addressed to the ECUs 15 to 22 connected through the communication ports P1 to P4 from any of the multiple communication ports P1 to P4.

When the received frame is a frame to be relayed to the multiple ECUs 15 to 22, the communication control unit 81 selects one or multiple communication ports P1 to P4 to which the ECUs 15 to 22 of the multiple communication ports P1 to P4 are connected, based on the tables 73, 75, 77, and 79 indicating through which of the multiple communication ports P1 to P4 the multiple ECUs 15 to 22 are connected. The communication control unit 81 transmits the frame to the selected one or multiple communication ports P1 to P4.

According to the configuration described above, when relaying the frame to the multiple ECUs 15 to 22, the frame can be transmitted to only the communication ports P1 to P4 in which the multiple ECUs 15 to 22 exist, based on the tables 73, 75, 77, and 79. Therefore, the unnecessary communication can be inhibited.

(1b) In one aspect of the present disclosure, one or more other ECUs 11 to 14 are connected to the multiple communication ports P1 to P4 through one or more communication lines 31 to 42, respectively. The tables 73, 75, 77, and 79 include which of the ECUs 11 to 14 the multiple ECUs 15 to 22 are connected to. Then, the communication control unit 81 selects the communication ports P1 to P4 having the smallest number of hops among the multiple communication ports P1 to P4 based on the tables 73, 75, 77, and 79.

According to the configuration described above, since the communication ports P1 to P4 for transmitting the frame are selected so that the number of routed other ECUs 11 to 14 is minimized, the amount of data flowing through the communication lines 31 to 42 can be minimized.

(1c) In one embodiment of the present disclosure, when the received frame is a frame transmitted from the ECUs 15 to 22 connected to the ECUs 11 to 14, which is the host devices, the communication control unit 81 generates a frame in which information on the number of hops are added to the received frame. In other words, a frame to which the tag including the TTL is added is generated. Then, the communication control unit 81 transmits the generated frame.

According to such a configuration, since the ECUs 11 to 14 transmit the frame to which the information on the number of hops is added to the other ECUs 11 to 14, the other ECUs 11 to 14 can determine whether or not to further relay the received frame to the other ECUs 11 to 14 based on the information of the number of hops. Therefore, the unnecessary communication can be inhibited.

(1d) In one aspect of the present disclosure, when the received frame includes the information on the number of hops, the communication control unit 81 determines whether or not to transmit the received frame to the other ECUs 11 to 14 based on the number of hops.

The communication control unit 81 transmits the received frame when it is determined that the received frame is to be transmitted to the other ECUs 11 to 14 when the received frame includes information on the number of hops.

According to the configuration described above, when a frame is received from the other ECUs 11 to 14, it can be determined whether or not the received frame should be relayed to the other ECUs 11 to 14 based on the information on the number of hops.

(1e) In one aspect of the present disclosure, when transmitting a received frame, the communication control unit 81 updates information on the number of hops included in the received frame to information on a new number of hops obtained by subtracting the number of hops, and transmits a frame to which information on the updated number of hops is added.

According to the configuration described above, since the frame can be relayed while subtracting the information on the number of hops, the relaying can be terminated when the number of hops reaches a predetermined number.

In one aspect of the present disclosure, the other ECUs 11 to 14 are connected to each other in a ring shape through the multiple communication lines 31 to 42 connected to the multiple communication ports P1 to P4, respectively. The communication control unit 81 is configured to detect the abnormality of the multiple communication lines 31 to 42. When an abnormality is detected in any of the multiple communication lines 31 to 42, the communication control unit 81 selects the communication ports P1 to P4 to which the communication lines 31 to 42 in which the abnormality is not detected are connected.

According to the configuration described above, even when an abnormality occurs in the communication lines 31 to 42, since the communication ports P1 to P4 to which the communication lines 31 to 42 are not connected are selected, frames can be transmitted to the ECUs 15 to 22.

[2. Other Embodiments]

Although the embodiments of the present disclosure have been described above, the present disclosure is not limited to the embodiments described above, and various modifications can be made to implement the present disclosure.

(2a) The above embodiment is not limited to the above configuration. For example, the communication protocol may be a protocol other than Ethernet, or the number of ECUs and the number of ports may be other numbers.

(2b) In the above embodiment, a ring topology in which the multiple relay devices are arranged in a ring shape is employed as the redundant configuration, but any configuration may be adopted as long as a communication can be performed through the multiple paths. For example, a mesh topology or the like in which multiple relay devices are arranged in a mesh shape may be adopted.

(2c) The multiple functions of one component in the above embodiments may be realized by multiple components, or a function of one component may be realized by multiple components. In addition, multiple functions of multiple components may be realized by one component, or a single function realized by multiple components may be realized by one component. In addition, a part of the configuration of the above embodiment may be omitted. At least a part of the configuration of the above embodiment may be added to or substituted for the configuration of the other above embodiment.

(2d) In addition to the switches 51 to 54 described above, the present disclosure can be realized in various forms such as a system including the switches 51 to 54 as components, a program for causing a computer to function as the switches 51 to 54, a non-transitory tangible recording medium such as a semiconductor memory in which the program is recorded, and a frame relay method.

[3. Relationship Between the Configuration of Embodiments and the Configuration of the Present Disclosure]

In the above embodiment, the ECUs 11 to 14 correspond to the relay device in the present disclosure, and in the above embodiment, the ECUs 15 to 22 correspond to the transfer destination device in the present disclosure. In the above embodiment, the MAC address table 73 and the switch ID table 75 correspond to the connection information in the present disclosure. In the above embodiment, the multicast table 77 and the path determination table 79 correspond to the group information in the present disclosure. The configuration for receiving the frame among the configurations executed by the communication control unit 81 in the above embodiment corresponds to the receiving unit in the present disclosure.

The configuration of S130 to S150, S170 to S180, S200, and S420 among the configurations executed by the communication control unit 81 in the above embodiment corresponds to the selection unit in the present disclosure. The configuration of S130, S160, S190, S210, S320, and S350 to S360 corresponds to the transmission unit in the present disclosure. The configuration of S330 among the configurations executed by the communication control unit 81 in the above embodiment corresponds to the transmission determination unit in the present disclosure, and the configuration of S410 in the above embodiment corresponds to the abnormality detection unit in the present disclosure.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S110. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A relay device configured to relay a received frame, the relay device comprising: a plurality of communication ports respectively connected with a plurality of communication lines; a receiver that receives a frame addressed to a transfer destination device connected through one of the communication ports from the one of the plurality of communication ports; a selector that selects one or more of the plurality of communication ports respectively connected to one or more of a plurality of transfer destination devices among the plurality of communication ports, based on connection information indicating through which of the one or more of the communication ports the one or more of the transfer destination devices are connected and group information including information indicating whether the one or more of the transfer destination devices belong to a predetermined group when the frame received by the receiver is to be relayed to the one or more of the transfer destination devices;

and a transmitter that transmits the frame through selected one or more of the communication ports, wherein the selector is configured such that when the frame is to be relayed to the plurality of transfer destination devices, the selector determines whether the selector selects one of the plurality of communication ports or the selector selects the plurality of communication ports based on the connection information and the group information, and the selector is configured to determine whether the selector selects one of the plurality of communication ports or the selector selects the plurality of communication ports, minimizing a numerical number of routed other relay devices, the relay device is defined as a host relay device, one or more relay devices other than the host relay device are defined as one or more of other relay devices, each of the plurality of communication ports is respectively connected to one or more of the other relay devices through one or more of a plurality of communication lines, the connection information includes information indicating to which of the host relay device and the one or more of the other relay devices the one or more of the transfer destination devices are connected, a numerical number of relay devices disposed between the host relay device and the one or more of the transfer destination devices is defined a numerical number of hops, the selector selects the one or more of the communication ports having a smallest numerical number of hops among the plurality of communication ports based on the connection information the numerical number of routed other relay devices between the host relay device and the one or more of the transfer destination devices is defined as the numerical number of hops, and the selector is configured to determine whether the selector selects one of the plurality of communication ports or the selector selects the plurality of communication ports, so as to minimize a total of the numerical number of hops.

2. The relay device according to claim 1, wherein: the transmitter is configured to generate a frame in which information of the numerical number of hops is added to the received frame, and transmit a generated frame when the frame received by the receiver is transmitted from a communication device connected to the host relay device.

3. The relay device according to claim 2, further comprising: a transmission determination unit that determines whether the received frame is to be transmitted to the one or more of the other relay devices, based on the numerical number of hops when the received frame includes information of the numerical number of hops; and the transmitter transmits the received frame when the transmission determination unit determines that the received frame is to be transmitted to the one or more of the other relay devices and the received frame includes the information of the number of hops.

4. The relay device according to claim 3, wherein: the transmitter is configured to update the information of the numerical number of hops included in the received frame to information of a new numerical number of hops obtained by subtracting the numerical number of hops, and transmits a frame to which the information of the new numerical number of hops is added when the received frame is to be transmitted.

5. The relay device according to claim 1, wherein: the one or more of the other relay devices are connected to each other in a ring shape through the one or more of the communication lines respectively connected to each of the communication ports; the relay device further comprising: an abnormality detector configured to detect an abnormality of the plurality of communication lines, wherein: the selector selects the one or more of the communication ports to which the one or more of the communication lines, in which the abnormality is not detected, are connected when the abnormality is detected in another one of the plurality of communication lines.

6. A relay device configured to relay a received frame, the relay device comprising: a plurality of communication ports respectively connected with a plurality of communication lines; a receiver that receives a frame addressed to a transfer destination device connected through one of the communication ports from the one of the plurality of communication ports; a selector that selects one or more of the plurality of communication ports respectively connected to one or more of a plurality of transfer destination devices among the plurality of communication ports, based on connection information indicating through which of the one or more of the communication ports the one or more of the transfer destination devices are connected and group information including information indicating whether the one or more of the transfer destination devices belong to a predetermined group when the frame received by the receiver is to be relayed to the one or more of the transfer destination devices;

and a transmitter that transmits the frame through selected one or more of the communication ports, wherein the selector is configured to determine whether the selector selects one of the plurality of communication ports or the selector selects the plurality of communication ports, minimizing a numerical number of routed other relay devices, the relay device is defined as a host relay device, one or more relay devices other than the host relay device are defined as one or more of other relay devices, each of the plurality of communication ports is respectively connected to one or more of the other relay devices through one or more of a plurality of communication lines; the connection information includes information indicating to which of the host relay device and the one or more of the other relay devices the one or more of the transfer destination devices are connected, a numerical number of relay devices disposed between the host relay device and the one or more of the transfer destination devices is defined as the numerical number of hops, the selector selects the one or more of the communication ports having a smallest numerical number of hops among the plurality of communication ports based on the connection information, the numerical number of routed other relay devices between the host relay device and the one or more of the transfer destination devices is defined as a numerical number of hops, and the selector is configured to determine whether the selector selects one of the plurality of communication ports or the selector selects the plurality of communication ports, so as to minimize a total of the numerical number of hops.

* * * * *